(12) United States Patent
Burks

(10) Patent No.: US 7,077,952 B2
(45) Date of Patent: Jul. 18, 2006

(54) AEROBIC WASTEWATER TREATMENT SYSTEM

(75) Inventor: Bennette D. Burks, Richmond, VA (US)

(73) Assignee: Consolidated Treatment Systems, Inc., Franklin, OH (US)

( * ) Notice: Subject to any disclaimer, the term of this patent is extended or adjusted under 35 U.S.C. 154(b) by 13 days.

(21) Appl. No.: 10/850,982

(22) Filed: May 21, 2004

(65) Prior Publication Data

US 2005/0258084 A1    Nov. 24, 2005

(51) Int. Cl.
*C02F 3/02* (2006.01)
(52) U.S. Cl. ............ 210/151; 210/202; 210/220; 210/257.1
(58) Field of Classification Search ............... 210/150, 210/151, 202, 220, 257.1, 258, 259
See application file for complete search history.

(56) References Cited

U.S. PATENT DOCUMENTS

| | | | |
|---|---|---|---|
| 2,220,859 A * | 11/1940 | Bispham et al. ............ 210/150 |
| 3,825,119 A * | 7/1974 | Rost ............................ 210/150 |
| 3,923,656 A | 12/1975 | Krebs | |
| 3,933,641 A * | 1/1976 | Hadden et al. ............. 210/258 |
| 4,045,344 A * | 8/1977 | Yokota ....................... 210/151 |
| 4,246,114 A | 1/1981 | Krebs | |
| 4,904,387 A * | 2/1990 | Jordan ........................ 210/259 |
| 5,360,556 A * | 11/1994 | Ball et al. ................... 210/258 |
| 5,609,754 A * | 3/1997 | Stuth .......................... 210/151 |
| 5,707,513 A * | 1/1998 | Jowett et al. ............... 210/150 |
| 5,997,735 A * | 12/1999 | Gorton ........................ 210/151 |
| 6,224,752 B1 * | 5/2001 | Drewery ..................... 210/151 |
| 6,592,755 B1 * | 7/2003 | Nurse, Jr. ................... 210/150 |
| 6,758,973 B1 * | 7/2004 | Schwalbe ................... 210/151 |

* cited by examiner

*Primary Examiner*—Christopher Upton
(74) *Attorney, Agent, or Firm*—Porter, Wright, Morris & Arthur, LLP

(57) ABSTRACT

A wastewater treatment system integrates three tanks that oxidize organic compounds, retain solids, reduce nutrients, an inactivate pathogens, discharging an effluent that protects public health and the environment. The system homogenizes wastewater and controls its frequency, interval, volume, and rate of dosing into a treatment tank designed to develop, facilitate, optimize, and maintain dense microbial colonies both suspended in liquid and attached to engineered filter media. These colonies and filter media complete the oxidation, retention, reduction, and inactivation.

20 Claims, 5 Drawing Sheets

AEROBIC WASTEWATER TREATMENT SYSTEM

CROSS-REFERENCE TO RELATED APPLICATIONS

Not Applicable.

STATEMENT REGARDING FEDERALLY SPONSORED RESEARCH

Not Applicable

REFERENCE TO MICROFICHE APPENDIX

Not Applicable

FIELD OF THE INVENTION

The present invention generally relates to domestic sewage treatment systems and, more particularly, to aerobic waste treatment systems.

BACKGROUND OF THE INVENTION

One type of sewage treatment system operates using an aerobic bacterial process that breaks down waste materials into carbon dioxide and water. This aerobic treatment system has distinct advantages over the much more common anaerobic septic systems. The aerobic process is much faster and its products are less objectionable with regard to odor and flammability. U.S. Pat. Nos. 3,923,656 and 4,246,114, the disclosures of which are expressly incorporated herein in their entireties by reference, each disclose an aerobic waste treatment facility or system in which waste (often referred to as "wastewater") is treated under aerobic conditions to transform the waste to an essentially clear effluent.

Despite the efficiency of this aerobic treatment system, treatment performance is partially dependent upon the habits of the user. This treatment system also relies upon the development and maintenance of heterotrophic microbial colonies to provide wastewater treatment. For example, two users who produce equal volumes of wastewater over a twenty-four hour period but have widely differing flows over shorter periods can have widely differing results from their treatment systems. If the first user lives and works where the treatment system is installed, wastewater flows to the treatment system generally constantly throughout the twenty-four hour period. If the second user works elsewhere from where the treatment system was installed, wastewater flows to the treatment system only during a portion of the twenty-four hour period when the user is at home. Thus, the second user has very large flow during portions of the period and no flow at all during portions of the period. This changing and at times excessive flow of the second user can result in both nuisance and maintenance issues while the first user does not experience any of these issues.

Although infrequent, the change in flow can cause nuisance issues, particularly the development of "foam," which do not effect performance but may be considered nuisances by users and regulators. This foam may be a strain of bacteria that, while harmless, generates an aesthetic issue should it spill out of the system.

Excessive flow, which results from periods of intense wastewater production, can cause maintenance issues because excessive flow can reduce filtration of the effluent, leading to premature binding. This binding protects the environment by preventing ill-treated wastes from exiting the system but also creates additional maintenance demands because the filers must be replaced.

Thus, despite the efficiency of the aerobic waste treatment system, nuisance and maintenance issues may result from user habits and detract from customer acceptance of the treatment system. Accordingly, there is a need in the art for an improved aerobic waste treatment system.

SUMMARY OF THE INVENTION

The present invention provides an aerobic wastewater treatment system that overcomes at least some of the above-noted problems of the related art. According to the present invention, an aerobic wastewater treatment system comprises, in combination, a first tank adapted to receive, mix and partially treat wastewater, a second tank adapted to hold wastewater, and a third tank containing an aerator and engineered filter media that facilitate and maintain microbial colonies that oxidize organic matter, retain solids, reduce nutrients, and inactivate pathogens to treat wastewater and discharge effluent that is relatively clean of pollutants and pathogens. The first tank discharges partially-treated wastewater to the second tank. The second tank includes a pump and control system operatively connected to the pump to control the frequency, interval, volume and rate of transfer of wastewater from the second tank to the third tank.

According to another aspect of the present invention, an aerobic wastewater treatment system comprising, in combination, a holding tank adapted to hold wastewater and a treatment tank containing an aerator and engineered filter media that facilitate and maintain microbial colonies that oxidize organic matter, retain solids, reduce nutrients, and inactivate pathogens to treat wastewater and discharge effluent that is relatively clean of pollutants and pathogens. The holding tank includes a pump and control system operatively connected to the pump to control the frequency, interval, volume and rate of transfer of wastewater from the holding tank to the treatment tank. Dosing parameters of the pump and control system of the holding tank are selected to develop, facilitate, optimize and maintain conditions in the treatment tank that oxidize organic materials, retain solids, reduce nutrients, and inactivate pathogens.

From the foregoing disclosure and the following more detailed description of various preferred embodiments it will be apparent to those skilled in the art that the present invention provides a significant advance in the technology of aerobic wastewater treatment systems. Particularly significant in this regard is the potential the invention affords for providing a high quality, reliable, low maintenance system with improved operational performance. Additional features and advantages of various preferred embodiments will be better understood in view of the detailed description provided below.

BRIEF DESCRIPTION OF THE DRAWINGS

These and further features of the present invention will be apparent with reference to the following description and drawings, wherein.

Figure 1:
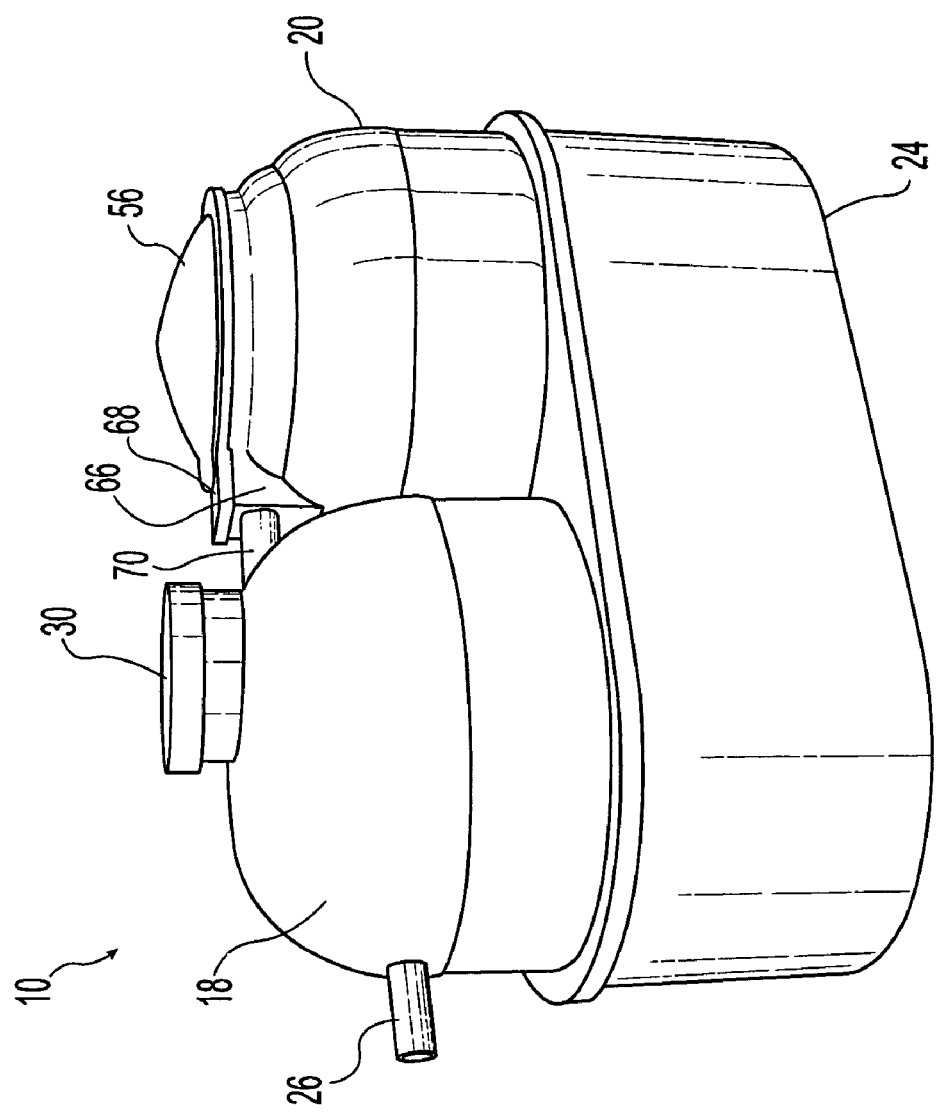
FIG. 1 is a perspective view of an aerobic wastewater treatment system according to a preferred embodiment of the present invention.
Figure 2:
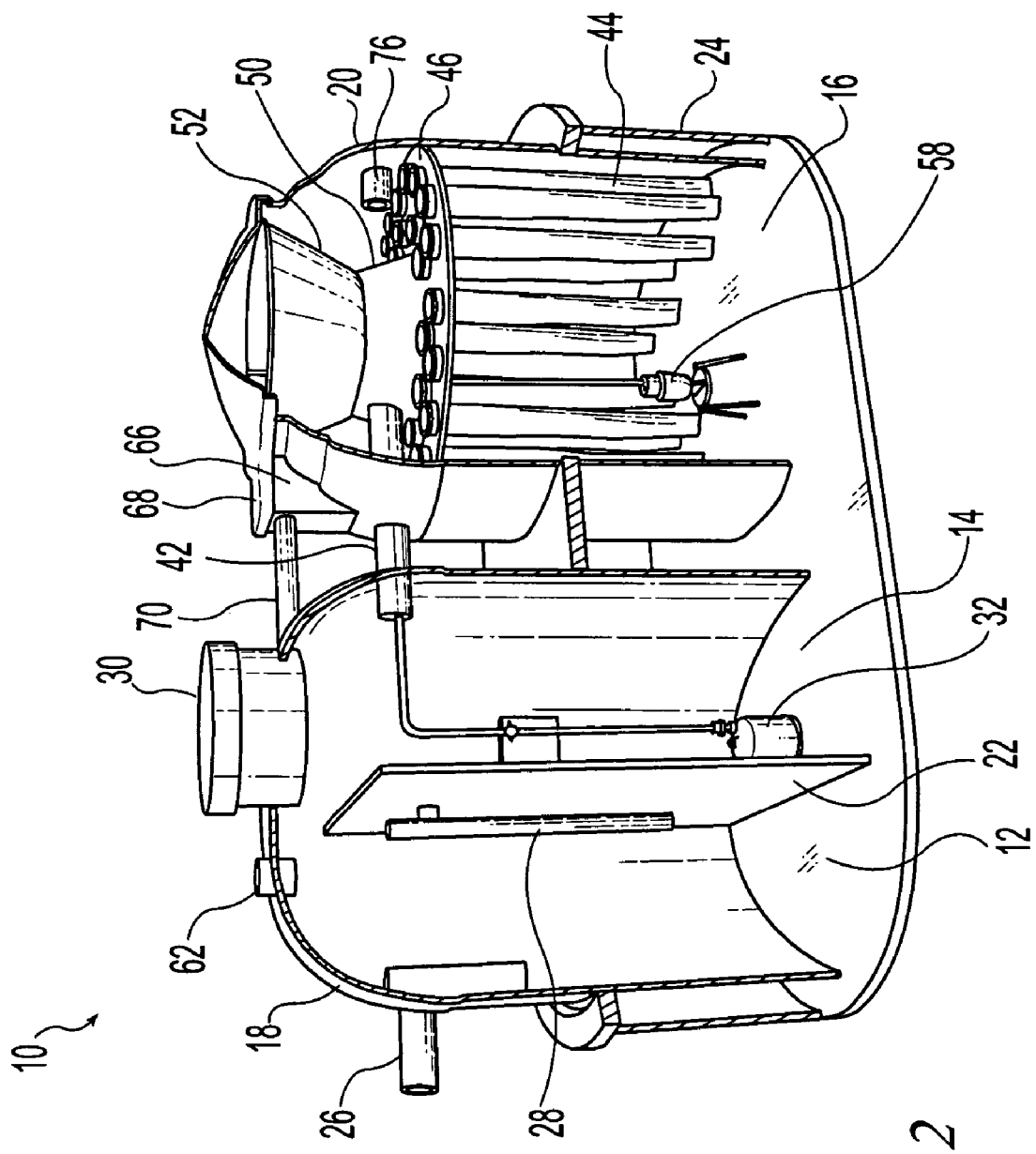
FIG. 2 is perspective view of the aerobic wastewater treatment system of FIG. 1 with portions removed to show interior components.
Figure 3:
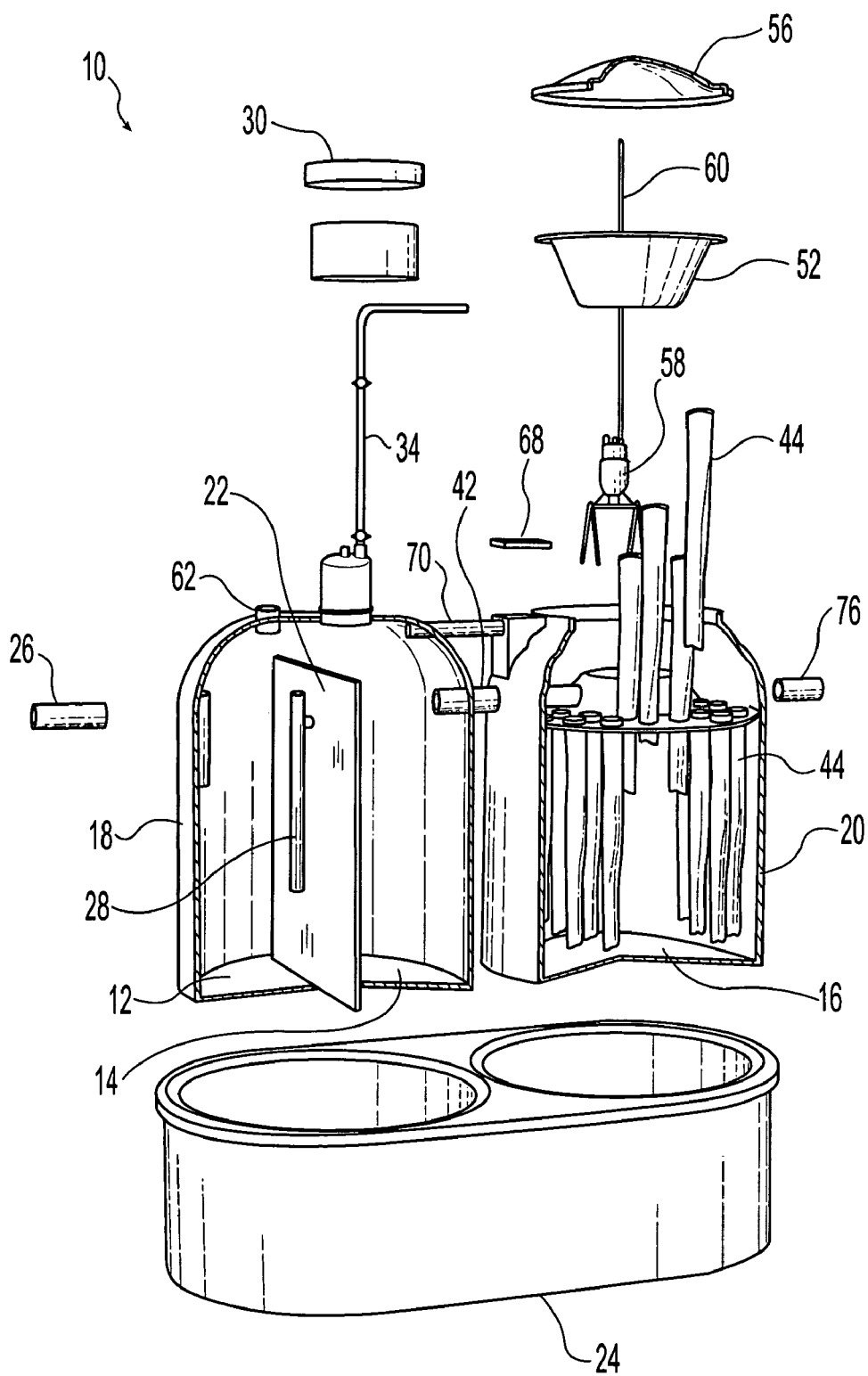
FIG. 3 is an exploded view of the aerobic wastewater treatment system of FIGS. 1 and 2.
Figure 4:
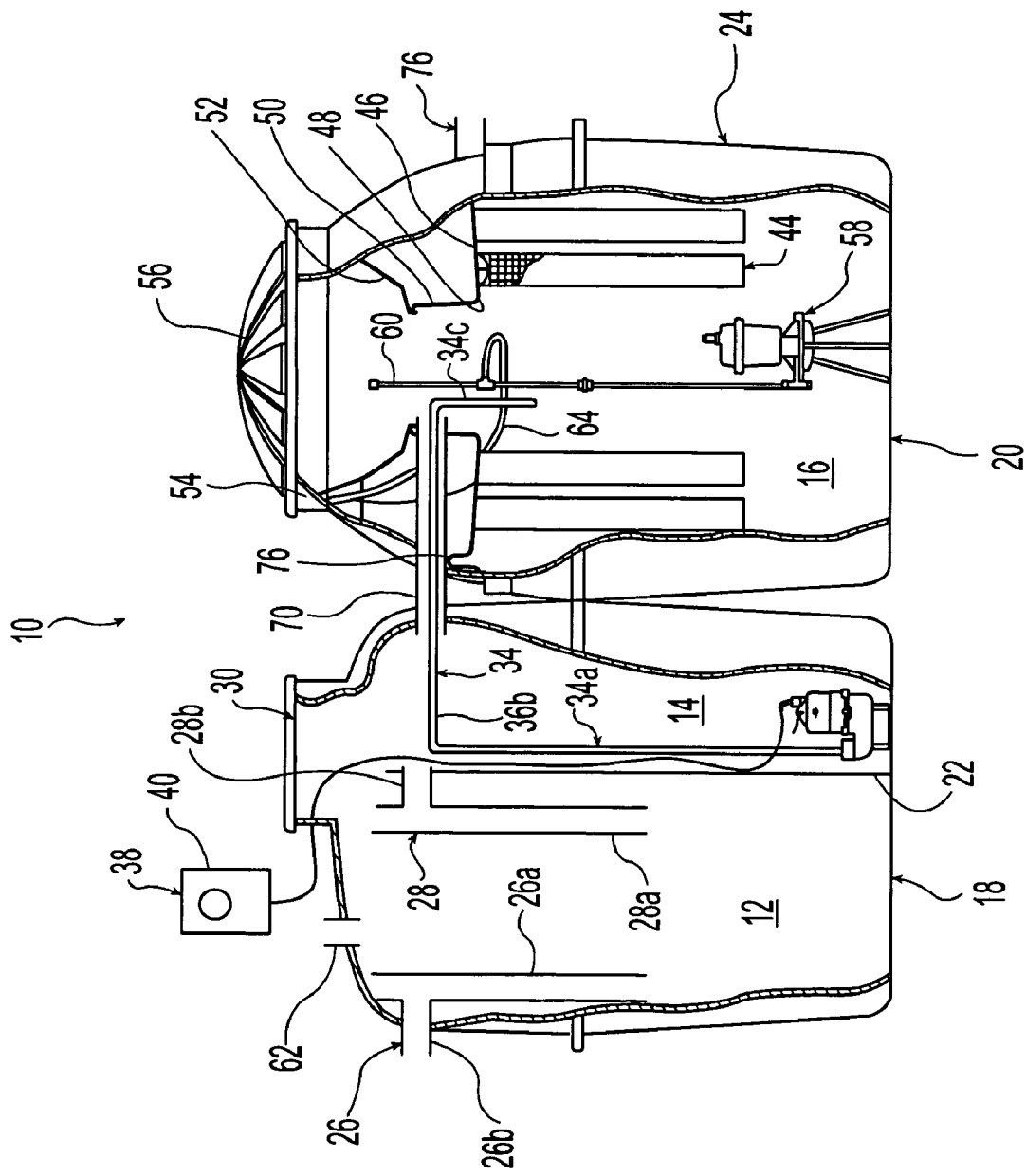
FIG. 4 is a diagrammatic elevational view showing the aerobic wastewater treatment system of FIGS. 1 to 3.

It should be understood that the appended drawings are not necessarily to scale, presenting a somewhat simplified representation of various preferred features illustrative of the basic principles of the invention. The specific design features of the treatment systems as disclosed herein, including, for example, specific dimensions, orientations, and shapes of the various components will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the treatment system illustrated in the drawings. In general, up or upward refers to an upward direction in FIG. 1 and down or downward refers to a downward direction in FIG. 1.

DETAILED DESCRIPTION OF CERTAIN PREFERRED EMBODIMENTS

It will be apparent to those skilled in the art, that is, to those who have knowledge or experience in this area of technology, that many uses and design variations are possible for the improved treatment systems disclosed herein. The following detailed discussion of various alternative and preferred embodiments will illustrate the general principles of the invention with reference to a wastewater treatment system for applications in residential or commercial environments. Other embodiments suitable for other applications will be apparent to those skilled in the art given the benefit of this disclosure.

Referring now to the drawings, FIGS. 1 to 4 illustrate an aerobic wastewater treatment system 10 according to a preferred embodiment of the present invention. The illustrated system includes a first or preliminary treatment tank 12, a second or holding/dosing tank 14, and a third or treatment tank 16. Wastewater sequentially flows through the first, second and third tanks 12, 14, 16 to treat the wastewater and remove organic material, solids, fats, oils grease, pathogens, and nutrients. Wastewater enters the system by flowing into the first tank 12 where it receives preliminary treatment. Partially-treated wastewater discharges by gravity from the first tank 12 to the second tank 14 where the partially-treated wastewater is held in the second tank 14 until it is dosed into the third tank 16 in a predetermined and controlled manner. Treatment of the wastewater is completed in the third tank 16 under controlled conditions so that relatively clear effluent is discharged from the third tank 16.

The illustrated aerobic wastewater treatment system 10 includes a first primary vessel 18 in which the first and second tanks 12, 14 are formed and a second primary vessel 20 in which the third tank 16 is formed. A wall 22 is provided within the first primary vessel 18 which divides the first primary vessel 18 into the first and second tanks 12, 14 and forms a common wall of the first and second tanks 12, 14. It is noted that the first, second, and third tanks 12, 14, 16 can alternatively be formed by a greater or lesser number of vessels. The lower portions of the illustrated first and second primary vessels 18, 20 are located in a containment vessel 24 sized and shaped for receiving the first and second primary vessels 18, 20.

The first tank 12 is sized and shaped to receive, mix, and partially treat the wastewater. The illustrated first tank 12 is an approximately four-hundred and fifty gallon tank but other suitable sizes can alternatively be utilized. Wastewater flows into the first tank 12 via an influent pipe 26 and out of the first tank 12 through an effluent pipe 28. The illustrated influent and effluent pipes 26, 28 are in the form of "Tees" so that the first tank 12 automatically maintains a constant volume of wastewater therein but other suitable means can alternatively be used. The illustrated influent and effluent pipes 26, 28 each have a substantially vertically extending portion 26a, 28a within the first tank 12 and a substantially horizontally extending portion 26b, 28b extending from the vertical portion 26a, 28a within the first tank 12 to a location outside of the first tank 12. The horizontal portions 26b, 28b are located at substantially the same height within the first tank 12 to automatically maintain a constant volume of wastewater within the first tank 12. The horizontal portion 26 of the influent pipe 26 extends through the outer wall of the first vessel 18 while the horizontal portion 28b of the effluent pipe 28 extends through the common wall 22 between the first and second tanks 12, 14 within the first vessel 18. The vertical portions 26a, 28a of the illustrated influent and effluent pipes 26, 28 are located within the first tank 12 and have open ends. The bottom halves of the vertical sections 26b, 28b are of different lengths so that the lower ends are located at different heights to promote homogenization within the first tank 12. The illustrated influent and effluent pipes 26, 28 are four-inch pipes but other suitable sizes can be alternatively utilized.

Automatically maintaining the wastewater at a constant volume within the first tank 12 serves at least two purposes. First, the wastewater is separated into three factions: "grit" which settles to the bottom; "scum" which floats to the surface; and "clarified" partially-treated wastewater that is to be discharged to the second tank 14. The constant volume assures that only this clarified partially-treated wastewater is discharged to the second tank 14. Second, the constant volume serves to homogenize the clarified partially-treated wastewater. Throughout daily use, wastewater characteristics vary according to the source of the wastewater. Wastewater from a toilet has different constituents and concentrations than wastewater from a washing machine. These variations in wastewater can impede biological treatment. Homogenized wastewater moderates variations in wastewater characteristics and thus improves wastewater efficiency.

Because the first tank 12 is intended to retain grit and scum, an access port 30 is provided in the first vessel 18. The illustrated access port 30 allows maintenance personnel the ability to examine and remove the contents of the first tank 12 as well as provide access to components located within the second tank 14. Preferably, the wall 22 does not extend to the top of the vessel 18 to permit access to both the first and second tanks 12, 14 through the access port 30 and to permit air flow between the first and second tanks 12, 14.

As a volume of wastewater enters the first tank 12 through the influent pipe 26, an equal volume of clarified, partially-treated wastewater exits the first tank 12 through the effluent pipe 28. The effluent of the first tank 12 becomes the influent of the second tank 14 which holds the partially-treated wastewater and releases it to the third tank 16 for treatment under controlled conditions as described in more detail hereinafter.

Just as wastewater characteristics vary with the source of the wastewater, so does the volume of wastewater vary with its source. A toilet will produce a much smaller volume of wastewater than a washing machine. Daily, wastewater flow will be greatest in the morning and evening with less wastewater flowing during the middle of the day and late at night. Weekly, wastewater flow on weekends is typically higher than during weekdays. Variations in flow can adversely affect treatment efficiency. The aerobic wastewater treatment system 10 according to the present invention controls variations by providing the second tank 14 to control the rate, volume, interval, and frequency of wastewater transfer to the third tank 16. The present invention maximizes the wastewater treatment efficiency by applying wastewater to the third tank 16 at the rate, volume, interval, and frequency that matches the biological and mechanical treatment capabilities of the microbes and filtration media of the third tank 16.

The second tank 14 is sized and shaped to receive, hold, and dose the partially-treated wastewater to the third tank 16. The illustrated second tank 14 is a five-hundred gallon tank but other suitable sizes can alternatively be utilized. Wastewater flows into the second tank 14 via the effluent pipe 28 of the first tank 12 and thus is also the influent pipe 28 of the second tank 14. The second tank 14 is provided with a pump 32 and piping 34 to discharge wastewater from the second tank 14 to the third tank 16 at a controlled rate. Wastewater flows into the third tank 16 via the piping or effluent pipe of the second tank 14 and thus is also the influent pipe 34 of the third tank 16. Dose volume, interval, and frequency are controlled by a control system 38 having a control panel 40 that is operatively connected to the pump 32. The illustrated control panel 40 is located outside the first vessel 18 to provide easy access. The illustrated control system 38 includes a timer, a relay that activates the pump 32, and other associated electrical components. The timer controls the dosing operation both in terms of the length of time the pump 32 runs and the interval of time between run times. The timer and the pump 32 are matched such that the pump 32 provides a predetermined dose of the partially-treated wastewater from the second tank 14 to the third tank 16 at a predetermined frequency. A suitable pump 32 is Model Sp33VF which is available from Barnes Pump, A Crane Company, of Mansfield, Ohio.

The illustrated dose piping 34 includes a first or vertical portion 34a extending from the pump 32 located near the bottom of the second tank 14 to a second or horizontal portion 34b extending from the second tank 14 to the third tank 16. The illustrated embodiment includes a horizontally extending conduit 42 between the first and second vessels 18, 20 for passage of the horizontal portion 34b of the dose piping 34 therebetween. Within the third tank 16, a third or downward portion 34c preferably extends from the horizontal portion 34b as described in more detail herein after. It is noted that the dose piping 34 can alternatively be formed in any other suitable manner.

The piping 34 is engineered such that it controls, at a fixed value, the rate at which wastewater is discharged from the second tank 14 to the third tank 16 through the dose piping 34. Rate control is a key component of the treatment system 10 because rate control affects the microbial and mechanical efficiency over and through engineered filter media 44 of the third tank 16. The control panel 40, the pump 32, and the dose piping 34 control the frequency, duration, volume, and rate of wastewater application from the second tank 14 to the third tank 16. As an example, dosing frequency can be set to once every thirty minutes. If set this way, there will be forty-eight equal doses per day. If the design flow is seven hundred fifty gallons per day, each dose volume will be 15.625 gallons. The illustrated dose rate is limited to five gallons per minute, so the dose interval is 3.125 minutes, and the interval between doses is 26.875 minutes. It is noted that alternative dosing schemes are possible.

The third tank 16 is sized and shaped to receive and treat wastewater to complete the removal of organic material, solids, pathogens, and nutrients. The illustrated third tank 16 is a seven hundred and fifty gallon tank but other suitable sizes can alternatively be utilized. A suitable third tank 16 is described in detail in U.S. Pat. No. 4,246,114. The illustrated third tank 16 includes a hanger plate 46 having a plurality of openings therein for the engineered filter media 44 as described in more detail hereinafter. The hanger plate 46 also has a central opening 48 encircled by a vertically extending wall 50. A surge bowl 52 is removably mounted on an upper edge of the vertical wall 50. The second vessel 20 preferably has an upper opening 54 of sufficient size for removal of the surge bowl 52. A removable access cover 56 is preferably provided for the opening 54.

An aerator 58 is located inside the third tank 16 to mix and oxygenate the wastewater. Mixing and aeration facilitate and maintain the growth of microbes that perform the wastewater treatment. An air intake line 60 leads to the aerator 58 to draw air into the system. A vent pipe 62 preferably communicates the tanks 12, 14, 16 with external air. The illustrated vent pipe 62 is located in the first vessel 18 above the first tank 12 but alternatively other suitable locations can be utilized. Suitable control lines 64 extend between the aerator 58 and the control panel 40. The illustrated control panel 40 is located in a control box 66 located at the top of the second vessel 20 but other suitable locations can be utilized. A removable cover 68 is preferably provided for the control box 66. A suitable pipe of conduit 70 is preferably provided between the first and second vessels 18, 20 for passage of control lines between the first and second vessels 18, 20.

Figure 5:
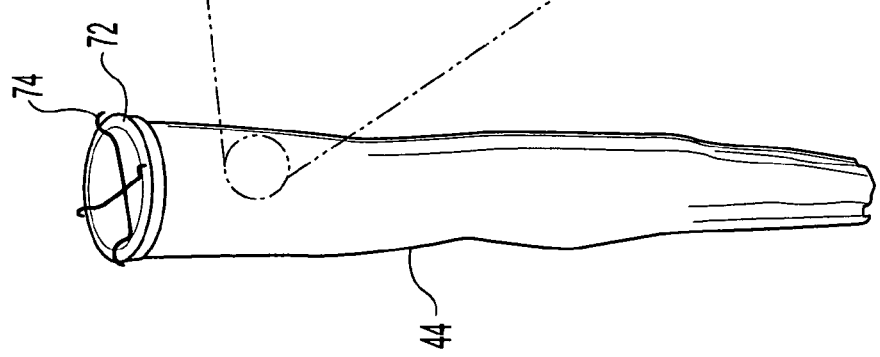
FIG. 5 is an enlarged fragmented view of a portion of FIG. 2 showing engineered filter media.

As best shown in FIG. 5, the illustrated engineered filter media 44 is in the form of a plurality of porous filter bags which extend downwardly through the openings in the hanger plate 46. The illustrated filter bags have outwardly turned beads 72 and spring clips 74 to secure the bags to the hanger plate 46. It is noted that alternately other suitable forms of the engineered filter media 44 and/or other securing means can be utilized.

The influent pipe 34 and an effluent pipe 76 of the third tank 16 are located so that the third tank 16 continuously holds a constant volume of wastewater. Preferably, the effluent line 76 is located lower than the conduit 42. Partially-treated wastewater enters through the influent pipe 34 and passes through the opening 48 in the holding plate to the third tank 16 where the water is held and treated by aerobic bacteria on the outer surface of the engineered filter media 44 as describe in more detail hereinafter. As a volume of partially-treated wastewater enters through the influent pipe 34, an equal volume of water is displaced and passes through the engineered filter media 44 into the interior of the filter bags, up to the top of the filter bags and through the openings in the hanger plate 46, over a weir 78 encircling the upper side of the hanger plate 46, and out through the effluent pipe 76.

Microbial growth follows two separate but related pathways. Some microbes are suspended in the liquid by the combination of mixing and aeration within the third tank 16. Other microbes attach themselves to the engineered filter media 44 that are submerged in water within the third tank 16. Both sets of microbes benefit from the mixing and aeration, but the microbes attached to the engineered filter media 44 also benefit from treatment byproducts, using them for respiration and thereby reducing nutrients in the effluent. The treatment efficiency of the treatment system 10 is a direct result of its ability to maximize the growth and maintenance of the attached microbes.

The engineered filter media 44 is preferably woven to maximize the ability of microbes to grow on, in, and among its fibers while also allowing water to pass there through. The result of this microbial growth is a biological filter that performs at least three functions. The first function is the development and maintenance of a microbial colony that oxidates organic material by aerobic respiration. In this process, organic material is transformed into water and carbon dioxide using oxygen to mediate the process. The second function is to remove nutrients by anoxic respiration. As a result, nitrogen gas ($N_2$) is formed as a byproduct. The third function is the development of a biologically based mechanical filter to strain solids, including pathogens and suspended material. This function requires proper filter media 44 selection. The engineered filter media 44 are preferably formed of woven polyester felt designed to have a minimum filtration capacity of 100 microns. The configuration, size, orientation, and density of the threads are preferably such that the fabric facilitates the growth of a biological layer. Suitable media is available from the Barney Corporation, Inc. of Columbus, Ohio. The previously described mixing and aeration promote this growth, leading to the development of dense microbial colonies that coat the exterior of the engineered filter media 44. This biological layer allows water to pass while simultaneously straining the water for consumption, capture, or death of organic matter, solids, and pathogens respectively.

Figure 6:
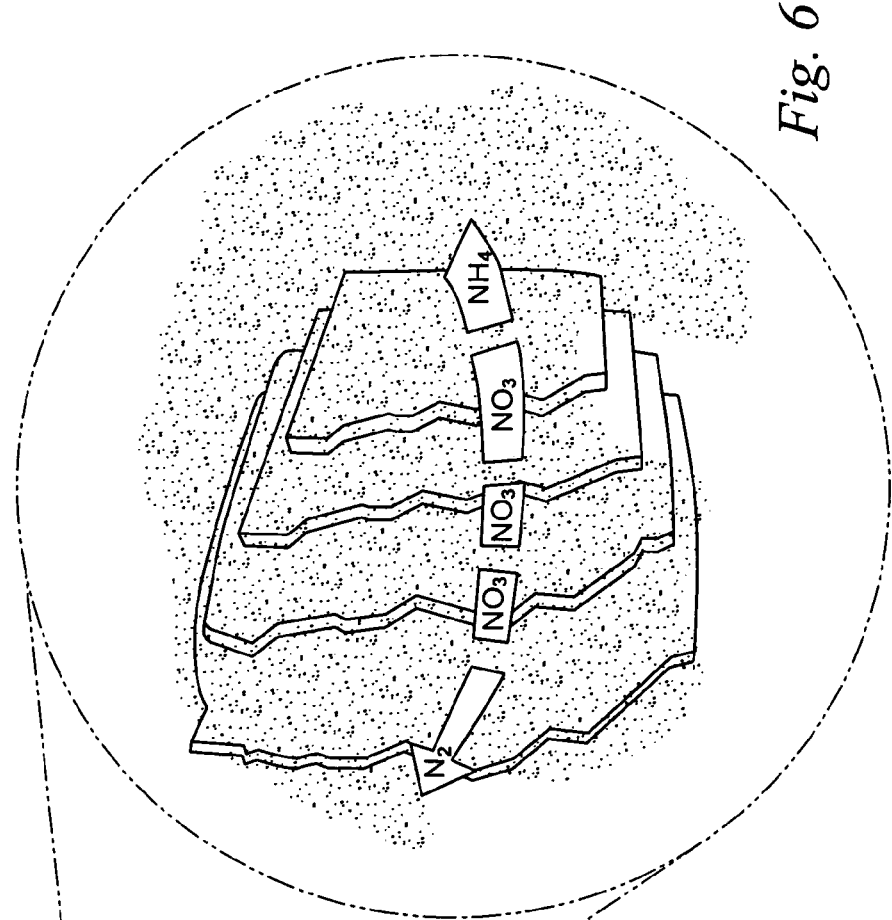
FIG. 6 is an enlarged fragmented view of a portion of the engineered filter media of FIG. 5 showing microbial layers of the engineered filter media.

As best shown in FIG. 6, as this biological layer deepens, it eventually divides into inner and outer zones, each having a distinct character. The outer zone includes microbes that rely entirely upon free oxygen ($O_2$) for aerobic respiration, which results in the oxidation of organic material. The inner zone, which is deprived of free oxygen, is able to use an oxygen substrate, nitrate ($NO_3$), to complete aerobic respiration. By using nitrate, these latter microbes remove from the wastewater and produce nitrogen ($N_2$), which escapes as a gas. The result is the removal of a nutrient linked to public health issues (metemoglobinemia) and environmental concerns (eutrophication of coastal estuaries). The engineered filter media 44, pump 32, and control system 38, are each selected and optimized to develop and facilitate these biological functions.

The treatment efficiency of the present treatment system 10 is such that the vast numbers of microbes will grow. The dense, living microbes and its predecessors all produce inert byproducts that contain nitrogen and phosphorous. These byproducts, which are captured by the engineered filter media 44, remain in the third tank 16 and bind and hold quantities of nitrogen and phosphorous. The effect of this binding is to remove two harmful nutrients from the effluent.

Wastewater includes, in part, human bodily wastes, which can contain tens of millions of pathogens. The pathogens may be in the form of parasites, single-cell or multi-cell organisms, cysts, bacteria, and/or viruses. The treatment system 10 according to the present invention can remove over 99.999 percent of these pathogens, as measured by the reduction of an indicator organism. Several processes accomplish this removal. First, the aerator 58 mixes large quantities of air into the wastewater, developing and maintaining aerobic conditions. Because many pathogens can survive only in the absence of oxygen, aeration alone is lethal. Surviving pathogens often serve as food source for innocuous microbes maintained by the present treatment system 10. These microbes remove pathogens through predation. Remaining pathogens are readily captured in the engineered filter media 44 and accompanying biological that forms. This biological layer, which serves as a fine sieve and source of predation, captures, holds, and otherwise serves as an inhospitable environment for the pathogens. The result is that the effluent from the effluent pipe 76 of the third tank 16 will show positive for few, if any, indicators of pathogens.

From the foregoing disclosure, it can readily be seen that the aerobic wastewater treatment system 10 according to the present invention provides an improved system to collect, hold, treat, and discharge wastewater in a manner that promotes public health and environmental protection. Furthermore, the present invention provides an aerobic treatment system 10 that improves the efficiency of prior art aerobic treatment systems and provides significant advantages through the integration of optimized treatment trains and operation sequence, and enhanced microbial treatment by optimized microbial growth on engineered filter media 44. Specifically, the present invention uses novel approaches and techniques that provide for the most efficient removal of organic material and solids from wastewater. This treatment is obtained through four distinct steps that occur within the three tanks 12, 14, 16. The first tank 12 provides two functions: partial removal of solids from the wastewater and homogenization of the partially-treated wastewater. The second tank 14 holds the partially-treated and homogenized wastewater and provides controlled dosing of the partially-treated and homogenized wastewater to the third tank 16. The third tank 16 includes the aerator 58 and engineered filter media 44 to complete treatment of the wastewater. At periodic intervals, the second tank 14 delivers to the third tank 16 a specific volume of wastewater delivered at a controlled rate. The dosing frequency, interval, volume, and rate of application are each calculated to maximize the completion of treatment, particularly by microbes living upon and mechanical activities occurring in the engineered filter media 44.

From the foregoing disclosure and detailed description of certain preferred embodiments, it will be apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. An aerobic wastewater treatment system comprising, in combination:
   a first tank adapted to receive, mix and partially treat wastewater;
   a second tank adapted to hold wastewater;
   wherein the first tank discharges partially-treated wastewater to the second tank;

a third tank containing an aerator and engineered filter media that facilitate and maintain microbial colonies that oxidize organic matter, retain solids, reduce nutrients, and inactivate pathogens to treat wastewater and discharge effluent which is relatively clean of pollutants and pathogens; and wherein the second tank includes a pump and control system operatively connected to the pump to control the frequency, interval, volume and rate of transfer of wastewater from the second tank to the third tank;

wherein the first second and third tanks are configured so that wastewater makes a single pass through the third tank;

wherein the third tank is adapted to maintain a constant volume of wastewater in the third tank; and wherein the pump and control system dose the third tank with pretreated wastewater from the second tank no faster than the microbial colonies in the third tank can transform pollutants in the wastewater while in the third tank.

2. The aerobic wastewater treatment system according to claim 1, wherein the first tank and the second tank are formed by a common wall in a single vessel.

3. The aerobic wastewater treatment system according to claim 1, wherein the first tank is adapted to maintain a constant volume of wastewater in the first tank.

4. The aerobic wastewater treatment system according to claim 3, wherein the first tank is adapted to retain undissolved substances in the first tank that both sink to the bottom of the first tank and float to the surface of liquid in the first tank.

5. The aerobic wastewater treatment system according to claim 4, wherein the first tank is adapted to homogenize wastewater entering the first tank with liquid within the first tank so that liquid discharged from the first tank is homogenized and relatively free of pollutants and pathogens.

6. The aerobic wastewater treatment system according to claim 1, wherein the third tank includes a holding chamber having an open mouth, a hanger plate extending across the open mouth and forming a medial opening, a vertically extending wall disposed about the medial opening, an effluent outlet about the medial opening, an inlet through the vertically extending wall, an outer shell extending upwardly from an upper edge of the holding chamber, an access opening in the outer shell, and an access cover covering the access opening in the outer shell, and wherein the engineered filter media is suspended from the hanger plate into the holding chamber through openings in the hanger plate.

7. The aerobic wastewater treatment system according to claim 1, wherein the engineered filter media provides a barrier to retain solids, microbes, and pathogens within the third tank.

8. The aerobic wastewater treatment system according to claim 1, wherein the engineered filter medium is in the form of socks.

9. The aerobic wastewater treatment system according to claim 1, wherein the aerator in the third tank is the only aerator in the treatment system.

10. The aerobic wastewater treatment system according to claim 1, wherein an inlet and an outlet of the first tank are at different heights to promote homogenization of wastewater within the first tank.

11. The aerobic wastewater treatment system according to claim 1, wherein an outlet of the first tank is located to remove wastewater located between solids that settle at the bottom of the first tank and scum that floats at the top of the wastewater located within the first tank.

12. The aerobic wastewater treatment system according to claim 1, wherein the pump and the control system transfer wastewater to the third tank with a dosing frequency of 30 minutes.

13. The aerobic wastewater treatment system according to claim 1, wherein the aerator includes an air inlet line to draw air into the system.

14. An aerobic wastewater treatment system comprising, in combination:
a holding tank adapted to hold wastewater;
a treatment tank containing an aerator and engineered filter media that facilitate and maintain microbial colonies that oxidize organic matter, retain solids, reduce nutrients, and inactivate pathogens to treat wastewater and discharge effluent that is relatively clean of pollutants and pathogens;
wherein the holding tank includes a pump and control system operatively connected to the pump to control the frequency, interval, volume and rate of transfer of wastewater from the holding tank to the treatment tank;
wherein the holding and treatment tanks are configured so that wastewater makes a single pass through the treatment tank;
wherein the treatment tank is adapted to maintain a constant volume of wastewater in the treatment tank; and
wherein the pump and control system dose the treatment tank with wastewater from the holding tank no faster than the microbial colonies in the treatment tank can consume organic material in the wastewater while the wastewater is in the treatment tank.

15. The aerobic wastewater treatment system according to claim 14, wherein treatment tank includes a holding chamber having an open mouth, a hanger plate extending across the open mouth and forming a medial opening, a vertically extending wall disposed about the medial opening, an effluent outlet about the medial opening, an inlet through the vertically extending wall, an outer shell extending upwardly from an upper edge of the holding chamber, an access opening in the outer shell, and an access cover covering the access opening in the outer shell, and wherein the engineered filter media is suspended from the hanger plate into the holding chamber through openings in the hanger plate.

16. The aerobic wastewater treatment system according to claim 14, wherein the engineered filter media provides a barrier to retain solids, microbes, and pathogens within the treatment tank.

17. The aerobic wastewater treatment system according to claim 14, wherein the engineered filter medium is in the form of socks.

18. The aerobic wastewater treatment system according to claim 14, wherein the aerator in the treatment tank is the only aerator in the treatment system.

19. The aerobic wastewater treatment system according to claim 14, wherein the pump and the control system transfer wastewater to the third tank with a dosing frequency of 30 minutes.

20. The aerobic wastewater treatment system according to claim 14, wherein the aerator includes an air inlet line to draw air into the system.

* * * * *